US012536156B2

United States Patent
Li et al.

(10) Patent No.: US 12,536,156 B2
(45) Date of Patent: Jan. 27, 2026

(54) UPDATING METADATA ASSOCIATED WITH HISTORIC DATA

(71) Applicant: MOTOROLA SOLUTIONS, INC., Chicago, IL (US)

(72) Inventors: Zili Li, Chicago, IL (US); Xiang Gao, Saugus, MA (US); Jari P. Jarvinen, Coral Springs, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 1368 days.

(21) Appl. No.: 17/189,160

(22) Filed: Mar. 1, 2021

(65) Prior Publication Data

US 2022/0276997 A1  Sep. 1, 2022

(51) Int. Cl.
 *G06N 5/02* (2023.01)
 *G06F 16/21* (2019.01)
 *G06F 16/23* (2019.01)
 *G06N 7/01* (2023.01)
 *G06N 20/00* (2019.01)

(52) U.S. Cl.
 CPC ........ *G06F 16/2379* (2019.01); *G06F 16/219* (2019.01); *G06N 5/02* (2013.01); *G06N 7/01* (2023.01); *G06N 20/00* (2019.01)

(58) Field of Classification Search
 CPC ... G06F 16/2379; G06F 16/219; G06N 20/00; G06N 7/01; G06N 5/02; G06N 7/005
 See application file for complete search history.

(56) References Cited

U.S. PATENT DOCUMENTS

| | | | |
|---|---|---|---|
| 9,087,297 B1 | 7/2015 | Filippova et al. | |
| 10,917,487 B2 * | 2/2021 | Nishikawa | G06V 30/19013 |
| 11,328,324 B1 * | 5/2022 | Thaker | G06Q 30/0256 |
| 11,328,424 B1 * | 5/2022 | Fitzgibbon | E05F 15/73 |
| 11,379,855 B1 * | 7/2022 | Anderson | G06N 20/00 |
| 11,983,623 B1 * | 5/2024 | Balasubramaniam | G06N 20/00 |
| 2013/0110620 A1 * | 5/2013 | Zhu | G06F 16/50 707/751 |
| 2014/0214885 A1 | 7/2014 | Park et al. | |

(Continued)

FOREIGN PATENT DOCUMENTS

CN   102799684 A   11/2012

*Primary Examiner* — Mariela Reyes
*Assistant Examiner* — Evel Honore
(74) *Attorney, Agent, or Firm* — Michael Best & Friedrich LLP

(57) ABSTRACT

A system for updating metadata associated with historic data. The system includes an electronic computing device. The electronic computing device is configured to receive historic data and metadata associated with the historic data and, using a low capacity machine learning model, analyze the metadata associated with the historic data to determine a probability that the historic data includes the object of interest. The electronic computing device is also configured to compare the probability to a predetermined threshold. The electronic computing device is further configured to use a high capacity machine learning model to analyze the historic data to determine whether the historic data includes the object of interest and update the metadata of the historic data based on whether the historic data includes the object of interest to generate updated metadata, when the probability is greater than or equal to the predetermined threshold.

19 Claims, 4 Drawing Sheets

(56) References Cited

U.S. PATENT DOCUMENTS

| | | | |
|---|---|---|---|
| 2016/0217390 A1* | 7/2016 | Shoaib | G06N 20/10 |
| 2018/0027260 A1 | 1/2018 | Aganiere et al. | |
| 2019/0250998 A1 | 8/2019 | Bedadala et al. | |
| 2020/0228616 A1* | 7/2020 | Nishikawa | H04L 67/54 |
| 2020/0285992 A1* | 9/2020 | Tanaka | G06N 20/00 |
| 2021/0098104 A1* | 4/2021 | Truscott | G06T 7/0002 |
| 2021/0160719 A1* | 5/2021 | Winter | G06N 3/045 |
| 2021/0374279 A1* | 12/2021 | Zheng | G06N 3/088 |
| 2022/0058513 A1* | 2/2022 | John | G06N 20/00 |
| 2022/0188569 A1* | 6/2022 | Ananthanarayanan | G06V 20/58 |
| 2022/0245349 A1* | 8/2022 | Pentyala | G06F 40/295 |
| 2022/0261814 A1* | 8/2022 | Smith | G06Q 20/389 |

\* cited by examiner

UPDATING METADATA ASSOCIATED WITH HISTORIC DATA

BACKGROUND OF THE INVENTION

There exist numerous systems for searching a database using a query generated by a user. Some of these systems search for information in the database that is relevant to the user's query by examining the metadata associated with the data stored in the databases.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
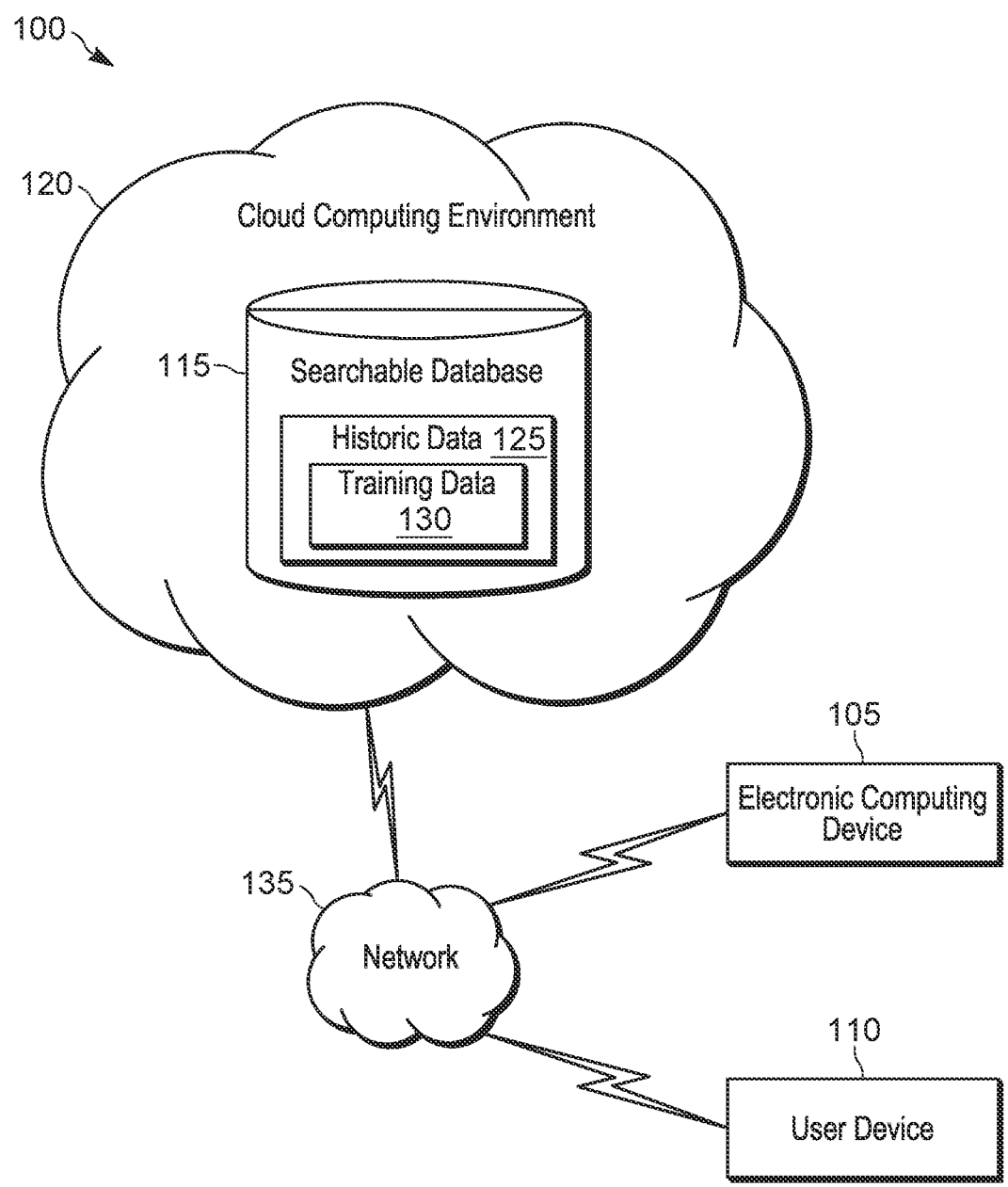
FIG. 1 is a block diagram of an example of a system for updating metadata associated with historic data in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In current systems, when data is received, it is analyzed, associated with metadata, and then stored in a database. When a user queries the database, the metadata associated with the data in the database is used to generate results to the user's queries. Over time, new metadata fields or tags may be created and data stored in the database before the new metadata fields or tags were created may need to be updated. There is a need for a system and method to efficiently and accurately update the metadata of historic data. As used herein, historic data refers to data that was included in a database before a new metadata field or tag is created. The system and method described herein allow metadata associated with historic data stored in a database to be analyzed to determine the probability that the historic data contains an object of interest. The metadata associated with the historic data is updated based on whether or not the historic data contains the object of interest. The probability that the historic data contains an object of interest is used to determine whether a high capacity machine learning model or a low capacity machine learning model is used to update the metadata of the historic data.

The cost of training and running (or executing) low capacity machine learning models is low compared to the cost of training and running (or executing) high capacity machine learning models. However, high capacity machine learning models are more accurate than low capacity machine learning models at detecting objects of interest in the historic data. Therefore, the method of updating metadata associated with historic data described herein conserves computer resources by using a low capacity model rather than a high capacity model to analyze historic data that has a low probability of including the object of interest. However, the method also preserves accuracy by using a high capacity model rather than a low capacity model to analyze historic data that has a high probability of including the object of interest.

One embodiment provides a system for updating metadata associated with historic data. The system includes an electronic computing device. The electronic computing device is configured to receive historic data and metadata associated with the historic data and, using a low capacity machine learning model, analyze the metadata associated with the historic data to determine a probability that the historic data includes the object of interest. The electronic computing device is also configured to compare the probability to a predetermined threshold. The electronic computing device is further configured to use a high capacity machine learning model to analyze the historic data to determine whether the historic data includes the object of interest and update the metadata of the historic data based on whether the historic data includes the object of interest to generate updated metadata, when the probability is greater than or equal to the predetermined threshold.

Another embodiment provides a method for updating metadata associated with historic data. The method includes receiving, with an electronic computing device, historic data and metadata associated with the historic data and, using a low capacity machine learning model, analyzing the metadata associated with the historic data to determine a probability that the historic data includes the object of interest. The method also includes comparing the probability to a predetermined threshold and, when the probability is greater than or equal to the predetermined threshold, using a high capacity machine learning model to analyze the historic data to determine whether the historic data includes the object of interest and updating the metadata of the historic data based on whether the historic data includes the object of interest to generate updated metadata.

FIG. 1 is a block diagram of an example of a system 100 for updating metadata associated with historic data. In the example embodiment illustrated, the system 100 includes an electronic computing device 105, a user device 110, and a searchable database 115 which is included in a cloud computing environment 120. The searchable database 115 includes historic data 125. A subset of the historic data 125 is training data 130. In some embodiments, the searchable database 115 includes components (for example, an electronic processor, a memory, and a communication interface) that are not illustrated herein and is configured to perform the functionality described herein as being performed by the electronic computing device 105. In some embodiments, the electronic computing device 105 is included in the cloud computing environment 120. The electronic computing device 105, user device 110, and cloud computing environment 120 are connected via a communication network 135. The communication network 135 (which may be an example of an "intervening internet protocol (IP) network") may include wireless and wired portions. In some embodiments, the communication network 135 is implemented using one or more existing networks, for example, a cellular network, the Internet, a land mobile radio (LMR) network, a Bluetooth™ network, a wireless local area network (for example, Wi-Fi), a wireless accessory Personal Area Networks (PAN), a Machine-to-machine (M2M) autonomous network, and a public switched telephone network. The network 135 may also include future developed networks.

It should be understood that the system 100 may include a different number of each of the components illustrated as being included in the system 100 than the number illustrated in FIG. 1. For example, the system 100 may include a different number of user devices than the single user device 110 illustrated in FIG. 1, a different number of electronic computing devices than the electronic computing device 105 illustrated in FIG. 1, a different number of databases than the single searchable database 115 illustrated in FIG. 1, and the like. It should also be understood that the components of the system 100 may communicate with one another via one or more intermediary devices, including those not illustrated in FIG. 1. It should further be understood that the functionality described herein as being performed by one component of the system 100 of FIG. 1 may be performed by one or more different components of the system 100, for example in a distributed manner, including components that are not illustrated in FIG. 1.

Figure 2:
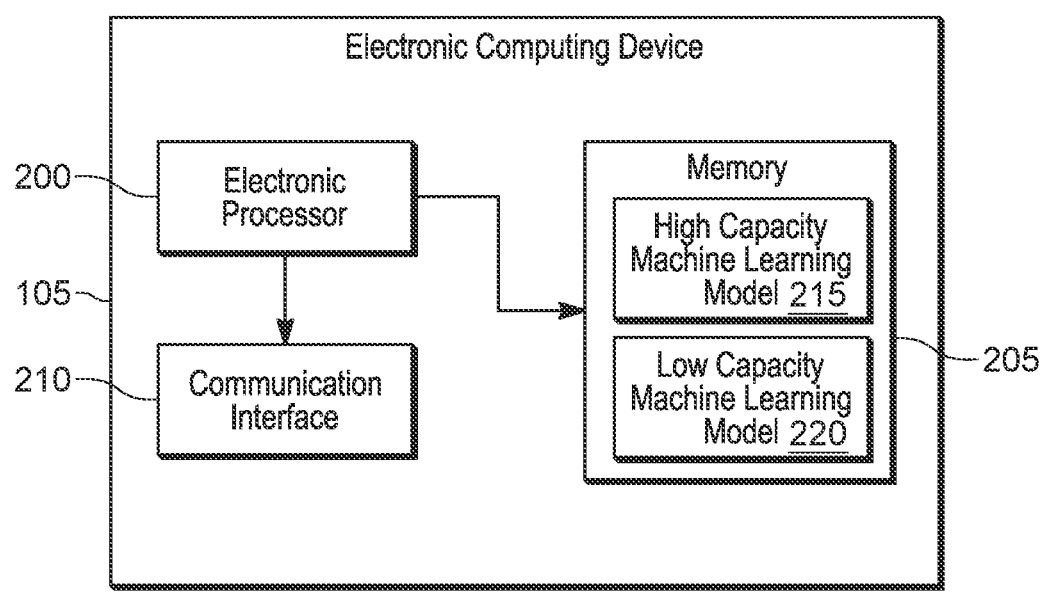
FIG. 2 is a block diagram of an electronic computing device included in the system of FIG. 1 in accordance with some embodiments.

FIG. 2 is a block diagram of an example of the electronic computing device 105 included in the system 100 of FIG. 1. In the example illustrated, the electronic computing device 105 includes an electronic processor 200 (for example, one or more of the electronic devices mentioned previously), a communication interface 210 (including, for example, a transceiver for communicating over one or more networks (for example, the communication network 135)), and a memory 205 (a non-transitory, computer-readable storage medium). The memory 205 may include, for example, a hard disk, a CD-ROM, an optical storage device, a magnetic storage device, a read only memory (ROM), a programmable read only memory (PROM), an erasable programmable read only memory (EPROM), an electrically erasable programmable read only memory (EEPROM), a Flash memory, or a combination of the foregoing. The electronic processor 200, communication interface 210, and memory 205 communicate wirelessly or over one or more communication lines or buses. It should be understood that electronic computing device 105 may include more, fewer, or different components than those components illustrated in FIG. 2.

The memory 205 includes a high capacity machine learning model 215 and a low capacity machine learning model 220. The low capacity machine learning model 220 is a machine learning model with the ability to learn shallow or simple relationships between a limited number of variables. For example, the low capacity machine learning model 220 may be a linear regression model, a support vector machine, or the like. The high capacity machine learning model 215 is a machine learning model with the ability to learn complex relationships between a greater number of variables than a low capacity machine learning model is able to. For example, the high capacity machine learning model 215 may be a deep neural network or the like. Additionally, the cost of training and running the low capacity machine learning model 220 is lower than the cost of training and running high capacity machine learning model 215.

Figure 3:
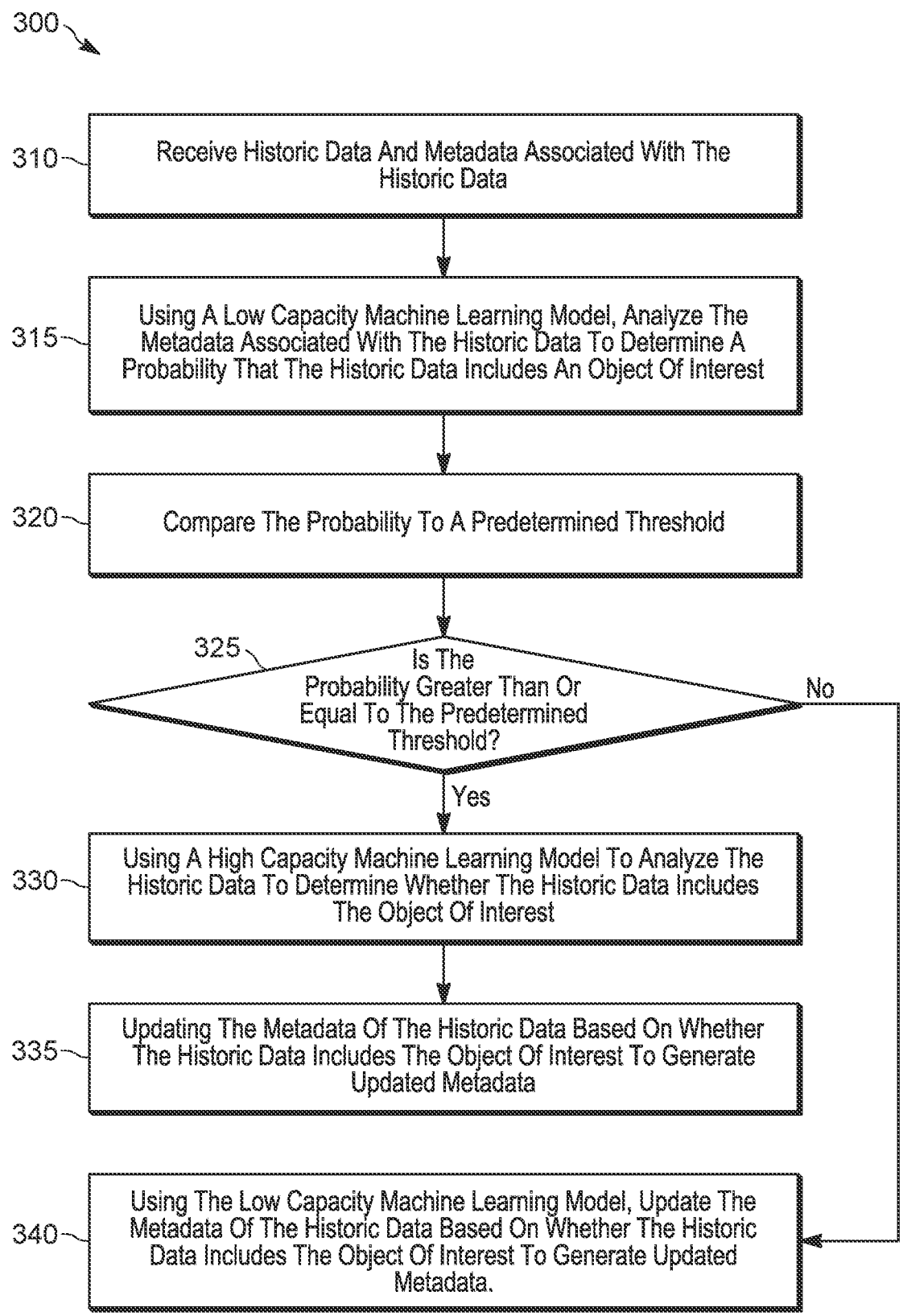
FIG. 3 is a flowchart of an example method for updating metadata associated with historic data in accordance with some embodiments.

FIG. 3 is a flowchart of an example method 300 for updating metadata associated with historic data (for example, the historic data 125). In some embodiments, the historic data 125 includes audio data, visual data, textual data, or a combination of the foregoing. For example, the historic data 125 may include a plurality of images. The images each include one or more visual features which are objects of interest. For example, objects of interest which the images may include are people, animals, vehicles, furniture, road signs, plants, a combination of the foregoing, or the like. In another example, the historic data 125 includes a plurality of video clips. The video clips may also include one of more objects of interest similar to those described above in relation to images. In some embodiments, objects of interest are actions in the video clips. An action may be, for example, a person running, a person climbing, a vehicle veering, a vehicle changing lanes, and the like. In yet a further example, the historic data 125 includes a plurality of audio clips. The audio clips may include one or more aural features which are objects of interest. An aural feature is, for example, a siren, a child crying, a fire crackling, a gunshot, a combination of the foregoing, and the like. In some embodiments, the historic data 125 includes a plurality of text files. The text files may include one or more textual features which are objects of interest. An object of interest included in a text file is, for example, a type of text file (for example, an internal memo, an email, a police report, or the like), a tone of the document (for example, formal, informal, positive, negative, a combination of the foregoing, or the like), a subject (for example, theft, assault, cardiac arrest, head trauma, or the like), a combination of the foregoing, or the like.

In some embodiments, the method 300 begins when the electronic processor 200 receives a high capacity machine learning model (for example, the high capacity machine learning model 215) for detecting an object of interest. In some embodiments, the high capacity machine learning model 215 is trained, by the electronic processor 200, to detect an object of interest. The historic data 125 has not been analyzed to determine whether it includes the object of interest which the high capacity machine learning model 215 has been trained to detect. For example, the historic data 125 may have only been analyzed to detect whether it includes dogs, cats, and birds and the high capacity machine learning model 215 has been trained to detect whether data includes butterflies. When the electronic processor 200 receives new data (data not included in the historic data 125), the electronic processor 200 uses one or more high capacity machine learning models, including the high capacity machine learning model 215, to determine metadata associated with the new data. The metadata associated with the new data includes whether or not the new data includes the object of interest. For example, in some embodiments, when the high capacity machine learning model 215 determines that the new data includes a butterfly (the object of interest), the new data is associated with a tag indicating the presence of a butterfly. In some embodiments, once the electronic processor 200 determines metadata associated with the new data and updates the historic data 125 using the method 300, the new data and the metadata associated with the new data is added to the historic data 125. In some embodiments, the electronic processor 200 uses the metadata associated with the new data and the metadata associated with the historic data 125 (for example, the training data 130) to train the low capacity machine learning model 220. In some embodiments, the low capacity machine learning model 220 is trained to learn the relationship between the objects of interest which the high capacity machine learning model 215 is trained to detect (for example, butterflies) and objects of interest whose presence in the historic data 125 is indicated in the metadata of the historic data 125 (for example, dogs, cats, and birds). For example, the low capacity machine learning model 220 may learn that the presence of a bird in an image indicates that there is a strong likelihood that a butterfly is also included in the image but the presence of a dog or cat in an image does not affect the likelihood that a butterfly is included in the image.

In some embodiments, the method 300 begins at block 310. At block 310, the electronic processor 200 receives historic data 125 and metadata associated with the historic data 125. In some embodiments the metadata includes information regarding the importance or popularity associated with the historic data 125. For example, the metadata includes a count of times that the historic data 125 has been accessed by a user, an importance score associated with a location where the historic data 125 was captured, an importance score associated with a device (for example, the user device 110) that captured the historic data 125, an importance score associated with a date-time stamp of the historic data 125, or a combination of the foregoing. In some embodiments the metadata includes information regarding visual features, aural features, or textual features of the historic data 125. For example, if the historic data 125 includes an image which includes a dog, a cat, and a bird but does not include a salmon, the metadata will include a tag indicating the presence of a dog in an image, a tag indicating the presence of a cat in an image, and a tag indicating the presence of a bird in an image. In another example, if the historic data 125 includes an image which includes a dog, a cat, and a bird but does not include a salmon, the metadata will include a positive value (for example, a numerical value set to '1', a Boolean value set to TRUE, or the like) in a field representing whether a dog is present in an image, a positive value (for example, a numerical value set to '1', a Boolean value set to TRUE, or the like) in a field representing whether a cat is present in an image, a positive value (for example, a numerical value set to '1', a Boolean value set to TRUE, or the like) in a field representing whether a bird is present in an image, and a negative value (for example, a numerical value set to '0' or "−1", a Boolean value set to FALSE, or the like) in a field representing whether a salmon is present in an image.

At block 315, using a low capacity machine learning model (for example, the low capacity machine learning model 220), the electronic processor 200 analyzes the metadata associated with the historic data 125 to determine a probability that the historic data 125 includes the object of interest. To produce the probability that the historic data 125 includes the object of interest, the low capacity machine learning model 220 may analyze metadata describing visual features, aural features, or textual features of the historic data 125. In some embodiments, the probability produced when the low capacity machine learning model 220 analyzes the metadata represents the importance of the historic data 125. To produce a probability representing the importance of the historic data 125, the low capacity machine learning model 220, may examine metadata including a count of times that the historic data 125 has been accessed by a user, an importance score associated with a location where the historic data 125 was captured, an importance score associated with a device that captured the historic data 125, an importance score associated with a date-time stamp of the historic data 125, or a combination of the foregoing. In some embodiments, the probability produced by the electronic processor 200 at block 315 may represent the likelihood that the historic data 125 includes the object of interest and the importance of the historic data 125.

At block 320, the electronic processor 200 compares the probability to a predetermined threshold. At block 325 and block 330, when the electronic processor 200 determines that the probability is greater than or equal to the predetermined threshold, the electronic processor 200 uses a high capacity machine learning model (for example, the high capacity machine learning model 215) to analyze the historic data 125 to determine whether the historic data 125 includes the object of interest. At block 335, the electronic processor 200 updates the metadata of the historic data 125 based on whether the historic data 125 includes the object of interest to generate updated metadata.

At block 325 and block 340, when the electronic processor 200 determines that the probability is less than the predetermined threshold, the electronic processor 200 uses the low capacity machine learning model to update the metadata of the historic data 125 based on whether the historic data 125 includes the object of interest to generate updated metadata. For example, the electronic processor 200 uses the analysis preformed at block 315 using the low capacity machine learning model 220 to update the metadata of the historic data 125.

In some embodiments, once the metadata associated with the historic data 125 is updated, the electronic processor 200 sends the historic data 125 with the updated metadata to a searchable database (for example, the searchable database 115). In some embodiments, the electronic processor 200 may receive a request, from, for example, the user device 110, for historic data associated with an object of interest. For example, the electronic processor 200 may receive a request for images with birds and, in response to the request, the electronic processor 200 may query the searchable database 115. Based on the results of the query, the electronic processor 200 may return one or more images including birds stored in the searchable database 115 to the user device 110.

Figure 4:
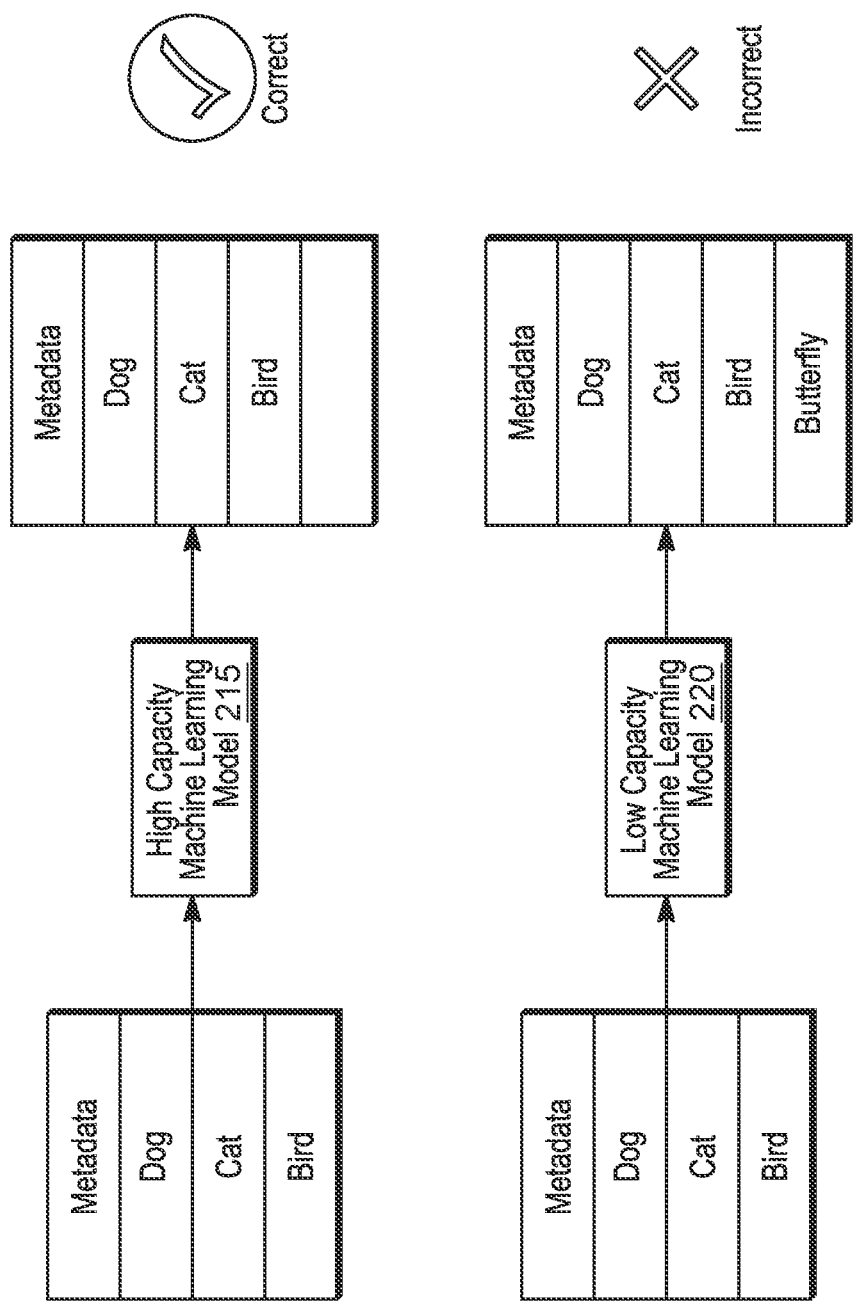
FIG. 4 is an example illustration of metadata associated with historic data being analyzed and updated by an electronic processor using a low capacity machine learning model and a high capacity machine learning model in accordance with some embodiments.

FIG. 4 is an example illustration of metadata associated with historic data 125 being analyzed and updated by the electronic processor 200 using the low capacity machine learning model 220 and high capacity machine learning model 215 to determine whether the historic data 125 includes an object of interest. In the example illustrated in FIG. 4, the historic data 125 is an image or a video clip and the object of interest is a butterfly. Before the historic data 125, the metadata associated with the historic data 125, or both is analyzed by the low capacity machine learning model 220, high capacity machine learning model 215, or both, the metadata associated with the historic data 125 indicates that the historic data 125 includes a dog, a cat, and a bird. The low capacity machine learning model 220 is trained to determine the relationship between the metadata (in this example, the dog, cat, and bird) and the object of interest (in this example, the butterfly). For example, the low capacity machine learning model 220 learns that the presence of a bird in an image indicates that there is a strong likelihood that a butterfly is also included in the image but the presence of a dog or cat in an image does not affect the likelihood that a butterfly is included in the image. The high capacity machine learning model 215 is trained to use the relationships between characteristics of the image or video clip (for example, colors, shapes, lines, and the like) and the relationship between the characteristics of the image or video clip and the object of interest. The high capacity machine learning model 215 is trained to determine whether the object of interest is included in new data or the historic data 125 based on characteristics of the new data or the historic data. The high capacity machine learning model 215 is more accurate in determining whether an object of interest exists than the low capacity machine learning model 220. For example, as illustrated in FIG. 4, when the high capacity machine learning model 215 and the low capacity machine learning model 220 analyze the same image or video clip, the high capacity machine learning model 215 may correctly determine that the image or video clip does not include a butterfly while the low capacity machine learning model 220 may incorrectly determine that the image or video clip does include a butterfly.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A system for conserving computing resources when executing a machine learning model to update metadata associated with historic data, the system comprising:
    an electronic processor, the electronic processor programmed to:
        train a low capacity machine learning model to determine whether an object of interest is included in historic data based on metadata associated with the historic data;
        train a high capacity machine learning model to determine whether the object of interest is included in the historic data based on characteristics of the historic data;
        receive the historic data and metadata associated with the historic data, wherein the historic data is at least one selected from the group consisting of audio data, visual data, and textual data;
        execute the low capacity machine learning model to analyze the metadata associated with the historic data to determine a probability that the historic data includes the object of interest;

compare the probability to a predetermined threshold; and when the probability is greater than or equal to the predetermined threshold, execute the high capacity machine learning model to analyze the historic data to determine whether the historic data includes the object of interest, wherein a cost associated with executing the low capacity machine learning model is lower than a cost associated with executing the high capacity machine learning model; and update the metadata of the historic data based on whether the historic data includes the object of interest to generate updated metadata.

2. The system according to claim 1, wherein the electronic processor is further configured to:

when the probability is less than the predetermined threshold, use the low capacity machine learning model to update the metadata of the historic data based on whether the historic data includes the object of interest to generate updated metadata.

3. The system according to claim 1, wherein the electronic processor is further configured to:

receive new data;

using the high capacity machine learning model, determine metadata associated with the new data, wherein the metadata associated with the new data includes whether or not the new data includes the object of interest; and use the metadata associated with the new data and the metadata associated with the historic data to train the low capacity machine learning model.

4. The system according to claim 1, wherein the metadata includes a count of times that the historic data has been accessed by a user, an importance score associated with a location where the historic data was captured, an importance score associated with a device that captured the historic data, an importance score associated with a date-time stamp of the historic data, or a combination of the foregoing.

5. The system according to claim 1, wherein the metadata includes information regarding visual features, aural features, or textual features of the historic data.

6. The system according to claim 1, the system further comprising a searchable database and wherein the electronic processor is further configured to:

send the historic data with the updated metadata to the searchable database.

7. The system according to claim 1, wherein a cost associated with training the low capacity machine learning model is lower than a cost associated with training the high capacity machine learning model.

8. The system according to claim 1, wherein the high capacity machine learning model is more accurate than the low capacity machine learning model at detecting the object of interest in the historic data.

9. A method for conserving computing resources when executing a machine learning model to update metadata associated with historic data, the method comprising:

training, with an electronic processor, a low capacity machine learning model to determine whether an object of interest is included in historic data based on metadata associated with the historic data;

training, with the electronic processor, a high capacity machine learning model to determine whether the object of interest is included in the historic data based on characteristics of the historic data;

receiving, with the electronic processor, the historic data and metadata associated with the historic data, wherein the historic data is at least one selected from the group consisting of audio data, visual data, and textual data;

executing, with the electronic processor, the low capacity machine learning model, to analyze the metadata associated with the historic data to determine a probability that the historic data includes the object of interest;

comparing the probability to a predetermined threshold; and when the probability is greater than or equal to the predetermined threshold, executing, with the electronic processor, the high capacity machine learning model to analyze the historic data to determine whether the historic data includes the object of interest, wherein a cost associated with executing the low capacity machine learning model is lower than a cost associated with executing the high capacity machine learning model; and updating the metadata of the historic data based on whether the historic data includes the object of interest to generate updated metadata.

10. The method according to claim 9, the method further comprising:

when the probability is less than the predetermined threshold, using the low capacity machine learning model to update the metadata of the historic data based on whether the historic data includes the object of interest to generate updated metadata.

11. The method according to claim 9, the method further comprising:

receiving new data;

using the high capacity machine learning model, determining metadata associated with the new data, wherein the metadata associated with the new data includes whether or not the new data includes the object of interest; and using the metadata associated with the new data and the metadata associated with the historic data to train the low capacity machine learning model.

12. The method according to claim 9, wherein the metadata includes a count of times that the historic data has been accessed by a user, an importance score associated with a location where the historic data was captured, an importance score associated with a device that captured the historic data, an importance score associated with a date-time stamp of the historic data, or a combination of the foregoing.

13. The method according to claim 9, wherein the metadata includes information regarding visual features, aural features, or textual features of the historic data.

14. The method according to claim 9, the method further comprising:

sending the historic data with the updated metadata to a searchable database.

15. The method according to claim 9, wherein a cost associated with training the low capacity machine learning model is lower than a cost associated with training the high capacity machine learning model.

16. The method according to claim 9, wherein the high capacity machine learning model is more accurate than the low capacity machine learning model at detecting the object of interest in the historic data.

17. The system according to claim 1, wherein the historic data is an image or a video clip and the electronic processor is configured to train a high capacity machine learning model to determine whether the object of interest is included in the historic data based on characteristics of the historic data by:
  training the high capacity machine learning model to determine whether the object of interest is included in the image or video clip based on relationships between the characteristics included in the image or video clip and relationships between characteristics included in the image or video clip and the object of interest.

18. The system according to claim 17, wherein the characteristics include colors, shapes, and lines.

19. A system for conserving computing resources when executing a machine learning model to update metadata associated with an image, the system comprising:
  an electronic processor, the electronic processor programmed to:
    train a low capacity machine learning model to determine whether an object of interest is included in the image based on metadata associated with the image, wherein the low capacity machine learning model is a linear regression model or a support vector machine;
    train a high capacity machine learning model to determine whether the object of interest is included in the image based relationships between the characteristics included in the image and relationships between characteristics included in the image and the object of interest, wherein the characteristics include colors, shapes, and lines and the high capacity machine learning model is a deep neural network;
    receive the image and metadata associated with the image;
    execute the low capacity machine learning model to analyze the metadata associated with the image to determine a probability that the image includes the object of interest;
    compare the probability to a predetermined threshold; and
    when the probability is greater than or equal to the predetermined threshold,
      execute the high capacity machine learning model to analyze the image to determine whether the image includes the object of interest, wherein a cost associated with executing the low capacity machine learning model is lower than a cost associated with executing the high capacity machine learning model; and
    update the metadata of the image based on whether the image includes the object of interest to generate updated metadata.

* * * * *